INVENTOR.
WALTER PUCHER
BY
Jennings Bailey, Jr.

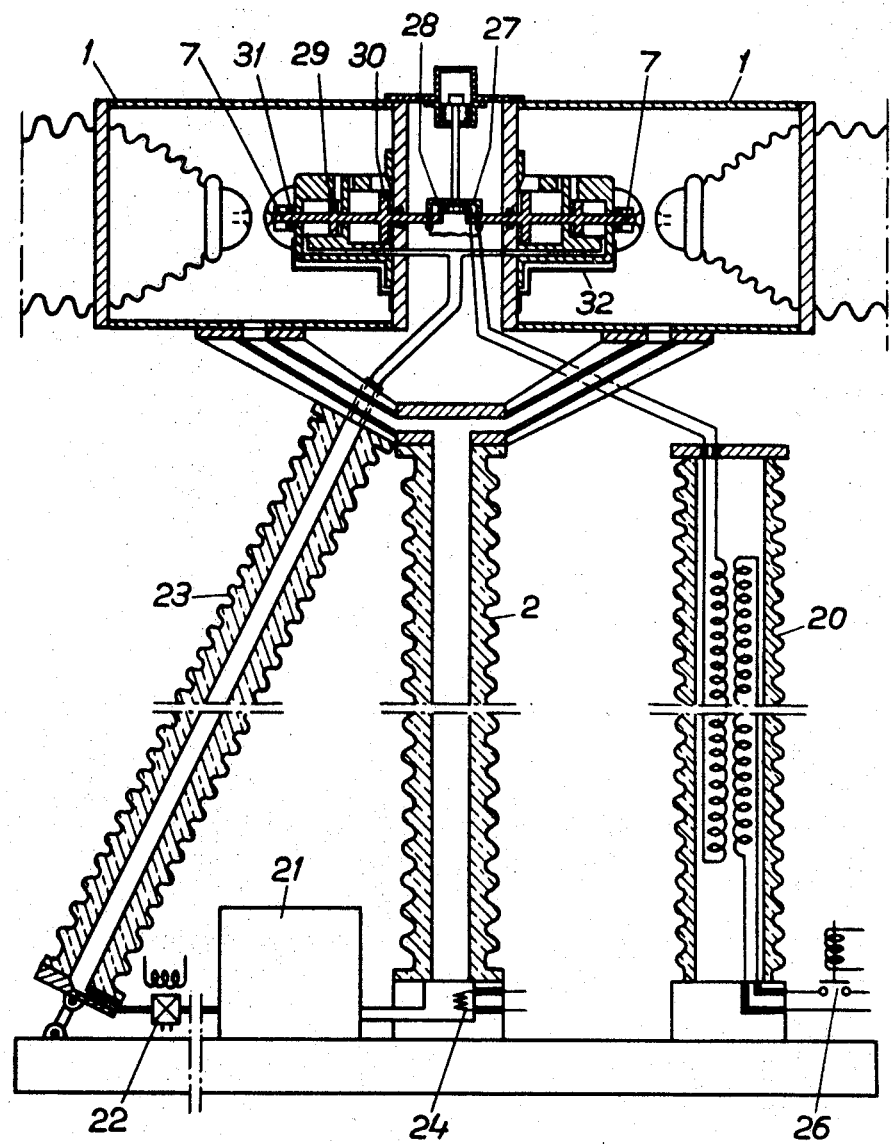

United States Patent Office 3,532,843
Patented Oct. 6, 1970

3,532,843
CONNECTION EQUIPMENT FOR HIGH VOLTAGE SWITCHING DEVICE
Walter Pucher, Ludvika, Sweden, assignor to Allmanna Svenska Elektriska Aktiebolaget, Vasteras, Sweden, a corporation of Sweden
Filed Aug. 21, 1967, Ser. No. 661,993
Claims priority, application Sweden, Aug. 29, 1966, 11,582/66
Int. Cl. H01h 33/60
U.S. Cl. 200—148    5 Claims

ABSTRACT OF THE DISCLOSURE

A high voltage circuit closer for use in power plants for HVDC, comprising a contact means arranged in a compressed gas container at high potential. The contact means comprises two stationary electrodes having rounded surfaces facing each other and connected by means of a plug-shaped contact displaceable centrally through one of said electrodes and fitting a recess in the other electrode.

BACKGROUND OF THE INVENTION

Field of the invention

The present invention relates to a high voltage switching device preferably intended for use on the occurence of faults in an electric network to rapidly short-circuit two or more connection points between which electric equipment is connected, for example a converter in a plant for high voltage direct current.

The prior art

By using such a switching device, usually called a circuit closer or short-circuiter, to rapidly short-circuit the input terminals of a converter it is possible to prevent damages arising as a result of over-loading or internal short-circuits in the converter. The circuit closer is used solely because it is considerably quicker than the main circuit breaker of the converter which comes into operation after a while and breaks the faulty current. Due to this demand for speed a circuit closer has small contact distance which, with the type of contact used up to now in circuit closers, has meant that reliable circuit closers could only be made for relatively low voltages.

SUMMARY OF THE INVENTION

The purpose of the invention is in the first place to extend the range of use of circurit closers so they can also be used for relatively high voltages. According to the invention this can be achieved by providing such devices with a contact means in a container filled with compressed gas placed at high potential, said contact means consisting of two stationary electrodes having well-rounded surfaces facing each other and being connected by means of a plug-shaped contact displaceable centrally through one of the electrodes, the free end part being arranged to fit a recess forming a socket contact arranged centrally in the other electrode. Such an arrangement of the contact means provides a favourable field configuration between the open contacts. This means that the contact distance may be kept small which is a pre-requisite condition for a short closing time. The use of compressed gas as insulating medium is also a contributory factor and in comparison with liquid and, solid insulating material, it also has the advantage that the dielectric strength between the contacts is not noticeably deteriorated by repeated closing operations under tension. By means of the contact proposed according to the invention, with a plug-shaped, movable contact which is pushed into a stationary socket contact, closing can take place without bouncing and extremely good contact is obtained in closed position. This means that the switching device can be used for relatively high rated current. Another advantage with this contact arrangement is that there is a certain distance allowed for braking the movable contact when it has reached closed position. Switching devices of the type in question must operate with extremely great contact acceleration and, in order that the various parts of the device shall not be subjected to too great stresses during braking, this may not be too rapid.

The two surfaces of the electrodes facing each other are preferably substantially similar and in order to obtain a favourable electric field configuration they may with advantage have a radius of curvature which is large in the central part of the electrodes and successively decreasing towards the edge, a so-called Rogowski profile. Another possibility is to use electrodes having spherical shape which are easier to manufacture.

According to a further development of the invention the switching device is released by means of an operating rod which is pre-stressed before the release. In this case the rod can be made rather thin which contributes to a short release time. A particularly simple and rapid release system can thus be obtained by using such a rod to transmit the release impulse from earth to high potential. The lower end of the rod is suitably connected to the armature of a magnet which in normal operation holds the armature in position against the influence of an upwardly directed force on the rod. This force can suitably be effected by means of compressed gas since compressed gas must in any case be available as insulation medium in the equipment.

With an operating system of the type mentioned the damping means necessary for braking the movable parts of the device is suitably arranged at the lower end of the rod. In this way the rod cannot be subjected to buckling strain during the braking movement.

Instead of using an insulating operating rod to transmit the release impulse from earth to high potential, an insulating transformer may also be used. In this way the solid movable part of the operating mechanism will always be the same size regardless of the insulating distance between high potential and earth so that the operating times will be the same at different insulating levels.

Other suitable modifications of the invention will be clear from the following.

BRIEF DESCRIPTION OF THE DRAWINGS

The invention will be further described with reference to the accompanying drawings in which FIGS. 1, 2 and 3 show in cross section three principal embodiments of circuit closers for high voltage consisting of two circuit closing elements.

DESCRIPTION OF THE PREFERRED EMBODIMENTS

Figure 1:
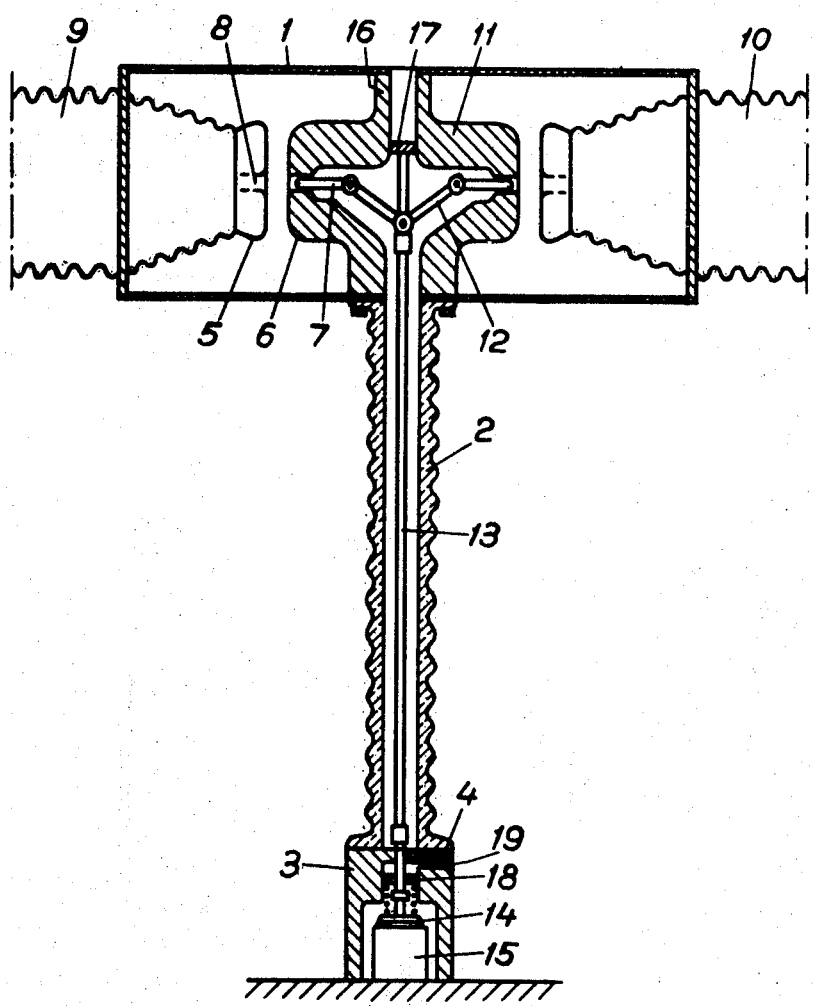

The circuit closer shown in FIG. 1 comprises a container 1 arranged at high potential and supported by a hollow supporting insulator 2 which rests on an earthed base 3. Through a channel 4 in the base 3 the space inside the hollow insulator 2 and the container 1 is in communication with a source of compressed gas, not shown, and is thus permanently filled with compressed gas. Two closing elements are arranged in the container 1 each of which comprises two stationary electrodes 5 and 6 having circular surfaces facing each other, the central part of which is substantially flat whereas the surfaces nearest the periphery are well rounded (a so-called Rogowski profile). The two electrodes can be connected by a plug-shaped contact 7 displaceable centrally through the electrode 6, the free end part of the contact during a closing movement of the circuit closer being pushed into a recess 8 forming a socket contact arranged centrally in the electrode 5. The electrodes 5 are supported by bushing insulators 9 and 10 arranged in the wall of the container 1, the outer ends of which, not shown, are intended to be connected to the input terminals of an electric apparatus or machine. The other electrodes 6 form an integral part of a mechanism housing 11 arranged centrally in the container 1 and containing a link system 12. This link system which is part of the operating mechanism of the movable contact is connected, by means of an insulating operating rod 13 arranged in the supporting insulator 2, to a magnetic armature 14. During normal operation this armature is held in position by a magnet 15 consisting of a permanent magnet with a release coil. The operating rod 13 which may, for example, be of glass-fibre reinforced plastic is at its upper end connected to a driving piston 17 displaceable in a cylinder 16. The compressed gas in the insulator 2 exercises a pressure on the driving piston 17 in upwards direction so that the operating rod 13 is permanently pre-stressed.

The circuit closer is closed by an electric impulse being sent to the coil of the magnet 15 so that the magnetic flux in the armature and thus the magnetic attraction of the magnet to the armature is reduced. The driving piston 17 thus moves the operating rod 13 and therefore the contacts 7 and the closing operation is performed. At the end position the rod and the contacts are retarded by a damping means, not shown, at the lower end of the rod. This may suitably be a pneumatic braking means of the type shown in FIG. 3. The device is opened by momentarily placing a return-piston 18 in the base 3 under pressure by supplying compressed gas to the space above the piston through an opening 19.

Figure 2:
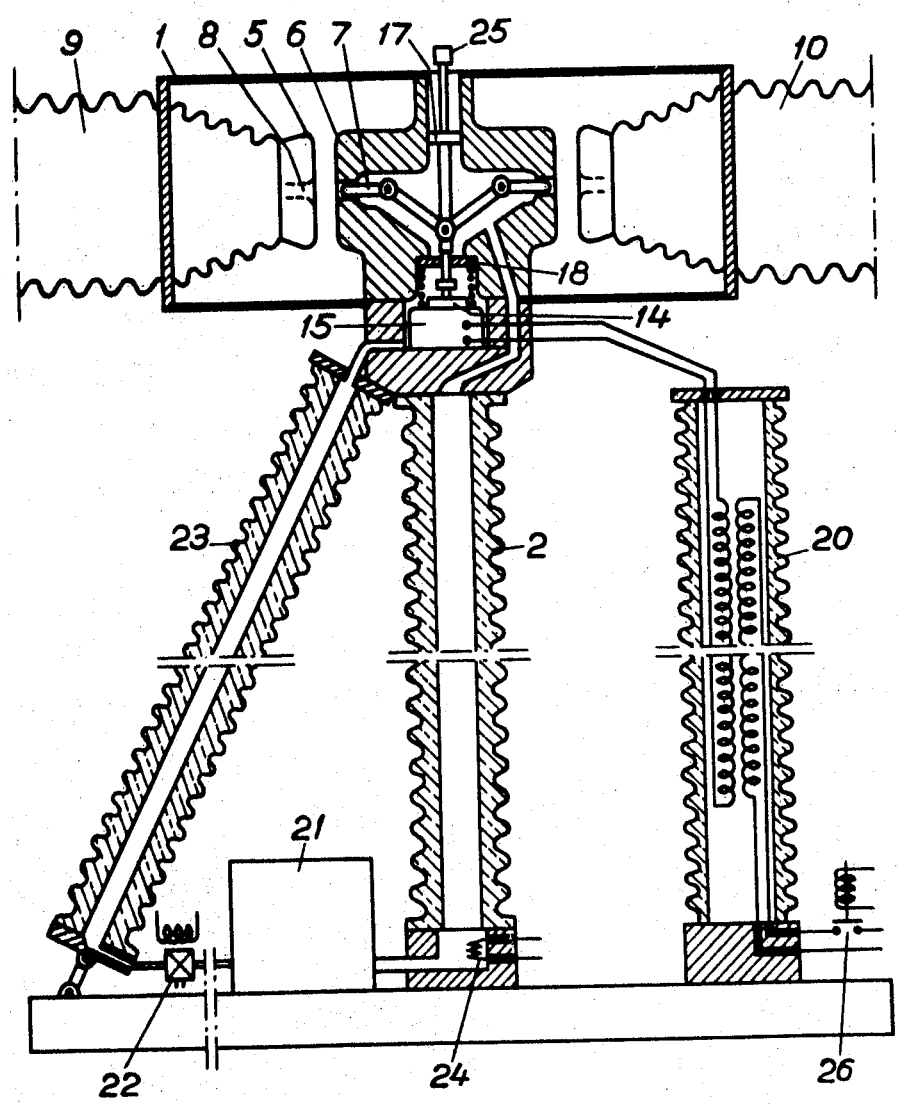

FIG. 2 shows a second embodiment of a circuit closer for high voltage where the operation takes place in principle in the same manner as that shown in FIG. 1. The magnet 15, however, is placed at high potential and the electric impulse to the release coil is transmitted from earth to high potential by means of an insulating transformer 20. The insulating rod 13 is thus unnecessary and the mass of the movable part of the operating mechanism will thus be independent of the insulating distance between high potential and earth. On the bottom frame of the circuit closer is arranged a compressed gas container 21 which through the hollow insulator 2 is in connection with the container 1 and through a three-way valve 22 can be connected to a gas-carrying insulator 23 for the opening operation of the closer. The compressed gas container 21 may be connected to a compressed gas source and is provided in conventional manner with the necessary valves, not shown. An electric heating element 24 is inserted in the lower part of the supporting insulator 2. An indicating means 25 showing the contact position of the closer is arranged in connection with the operating mechanism at high potential.

During normal operation the armature 14 is held in position against the magnet 15 and the gas-carrying insulator 23 is in communication with the compressed gas container 21 and the space below the return-piston 18 at high potential is thus also filled with compressed gas. The closer is closed when the contact 26 is closed and an electric impulse is then transmitted through the insulating transformer 20 to the release coil of the magnet 15. The attraction of the armature 14 ceases and the driving piston 17 can rapidly move the contacts to closed position. The contacts are opened by an electric impulse to the three-way valve 22 operated electro-magnetically and the space below the return-piston 18 at high potential is momentarily in communication with the open air through the bushing insulator 23.

FIGURE 3 shows an embodiment of a circuit closer having a different type of operating mechanism which is particularly suitable when even shorter closing times are desired than those which can be achieved by means of the arrangements according to FIGS. 1 and 2. With the arrangement according to FIG. 3 the magnet shown in the other figures is replaced by a mechanical blocking means 27. When the circuit closer is to close, the blocking means is removed by initiating an explosive charge 28 which is built into the hook of the blocking means. The explosive charge is detonated by an electric impulse supplied through the insulating transformer 20. The contacts 7 are then moved by driving pistons 29 and retarded by damping piston 30 when they reach closed position. The pistons and contact rods supporting the pistons may be dimensioned so that extremely great accelerations can be achieved. The current flow between the movable contacts 7 and the metallic pressure vessel 1 is effected with the help of hemispherical contacts 31 and flexible conductors 32. In the open position of the circuit closer the space on one side of the driving piston 29 is in communication with the open air through the bushing insulator 23 and valve 22. Upon an opening movement this space is placed in communication with the compressed air container 21 at earth potential and the movable contacts are moved to open position and held there.

Besides compressed air electronegative gases may also be used as compressed gas in this type of switching devices and such gases are particularly suitable from the point of view of dielectric strength. Compressed air, however, is considerably cheaper, especially as it is advantageous to use small driving pistons and relatively high pressure in order to achieve short closing times.

The invention is not limited to the shown embodiments. For example instead of being placed in pressure vessels of metal with electrical bushings, the electrodes and contacts could be arranged inside a container of insulating material filled with compressed gas. With higher voltages than the insulating voltage of a closing element, multiple circuit closers may be constructed by series-connecting a number of closing elements and the voltage is then evenly distributed over all the elements with the help of parallel impedances. With required modifications the shown operating arrangements could also be adapted for rapid opening instead of rapid closing.

I claim:

1. A high voltage switching device for rapidly short-circuiting two connection points comprising, in combination, (a) first and second conductive electrodes fixed with respect to one another and spaced from one another and having opposing surfaces, said opposing surfaces being smooth and being symmetrically disposed generally perpendicular to a common axis, at least the outer areas of said opposing surfaces curving away from one another, (b) a movable contact comprising an elongated member having a length at least as long as the axial spacing between said first and second opposing surfaces along said axis, said movable contact being coaxial with said axis and movable along said axis, (c) said first conductive electrode having an opening therein at said axis, said movable contact being slidably disposed in said opening and being movable between a first position in which said movable contact is completely withdrawn from the space between said opposing surfaces to a second position in which an end of said movable contact engages said second conductive electrode surface at an axial point thereon, (d) said movable contact being electrically connected to said first conductive electrode, (e) an operating means for moving said movable contact from said first position to said second position, said operating means including a piston and a compressed gas means, said piston being connected to said movable contact and permanently exposed to the gas pressure of said compressed gas means, thereby urging said movable contact to said second position, (f) a restraining means normally restraining operation of said operating means,
(g) a releasing means operatively connected to said restraining means, said releasing means including control means at earth potential,
(h) a container surrounding said electrodes and movable contact, said container being filled with compressed gas and placed at high potential.

2. A switching device according to claim 1, in which said restraining means comprises a substantially vertically disposed operating rod, which, before the release, is permanently tensioned in its longitudinal direction.

3. A switching device according to claim 1, in which said restraining means further comprises a magnet with an armature to which the lower end of said rod is connected, said magnet in normal operation holding said armature in position against the influence of an upwardly directed force on said rod.

4. A switching device according to claim 1, in which said restraining means comprises a catch and said releasing means comprises an explosive.

5. A switching device according to claim 1, in which said releasing means includes means to transmit an electric impulse from earth to high potential through an insulating transformer.

References Cited

UNITED STATES PATENTS

| 3,027,439 | 3/1962 | Upton et al. |
| 3,378,727 | 4/1968 | Kesselring. |

FOREIGN PATENTS

| 1,423,672 | 11/1965 | France. |
| 760,355 | 10/1956 | Great Britain. |

ROBERT S. MACON, Primary Examiner

U.S. Cl. X.R.

200—145